United States Patent [19]
Morgan

[11] 3,874,689
[45] Apr. 1, 1975

[54] NESTABLE CART

[75] Inventor: Lawrence M. Morgan, Anoka, Minn.

[73] Assignee: The Cornelius Company, Minneapolis, Minn.

[22] Filed: Nov. 6, 1972

[21] Appl. No.: 303,932

[52] U.S. Cl............ 280/33.99 H, 280/79.3, 280/489
[51] Int. Cl........................ B62b 11/00, B62b 3/02
[58] Field of Search............ 280/33.99 R, 33.99 H, 280/33.99 F, 33.99 S, 408, 493, 494, 36 R, 280/34 R, 43.12, 79.3, 79.1, 489

[56] References Cited
UNITED STATES PATENTS

| | | | |
|---|---|---|---|
| 1,650,767 | 11/1927 | Odiorne | 280/494 |
| 1,663,140 | 3/1928 | Remde | 280/479 A |
| 2,154,839 | 4/1939 | Franklin | 280/34 B |
| 2,928,681 | 3/1960 | Wilson | 280/33.99 S |
| 2,947,565 | 8/1960 | Wood | 280/79.1 X |
| 3,027,174 | 3/1962 | Garbarino | 280/33.99 H |
| 3,047,304 | 7/1962 | Kampf | 280/33.99 F |
| 3,295,866 | 1/1967 | Standfuss | 280/489 X |
| 3,464,715 | 9/1969 | Anderson | 280/36 R |
| 3,720,329 | 3/1973 | Gamble | 280/79.1 X |
| 3,746,358 | 7/1973 | Swick, Jr. et al. | 280/36 R |

FOREIGN PATENTS OR APPLICATIONS

| | | | |
|---|---|---|---|
| 1,169,317 | 11/1969 | United Kingdom | 280/33.99 |
| 439,993 | 12/1967 | Switzerland | 280/33.99 H |

Primary Examiner—David Schonberg
Assistant Examiner—David M. Mitchell
Attorney, Agent, or Firm—Hill, Gross, Simpson, Van Santen, Steadman, Chiara & Simpson

[57] ABSTRACT

A nestable cart includes a horizontal base of U-shaped configuration to which there is secured a shelf which is pivotable between lowered and upright positions, and a rigid side structure having a U-shaped horizontal cross section rigidly secured to the U-shaped base, the closed end of the U-shaped configuration of the base and side structure being nestable within corresponding elements of another such cart.

13 Claims, 7 Drawing Figures

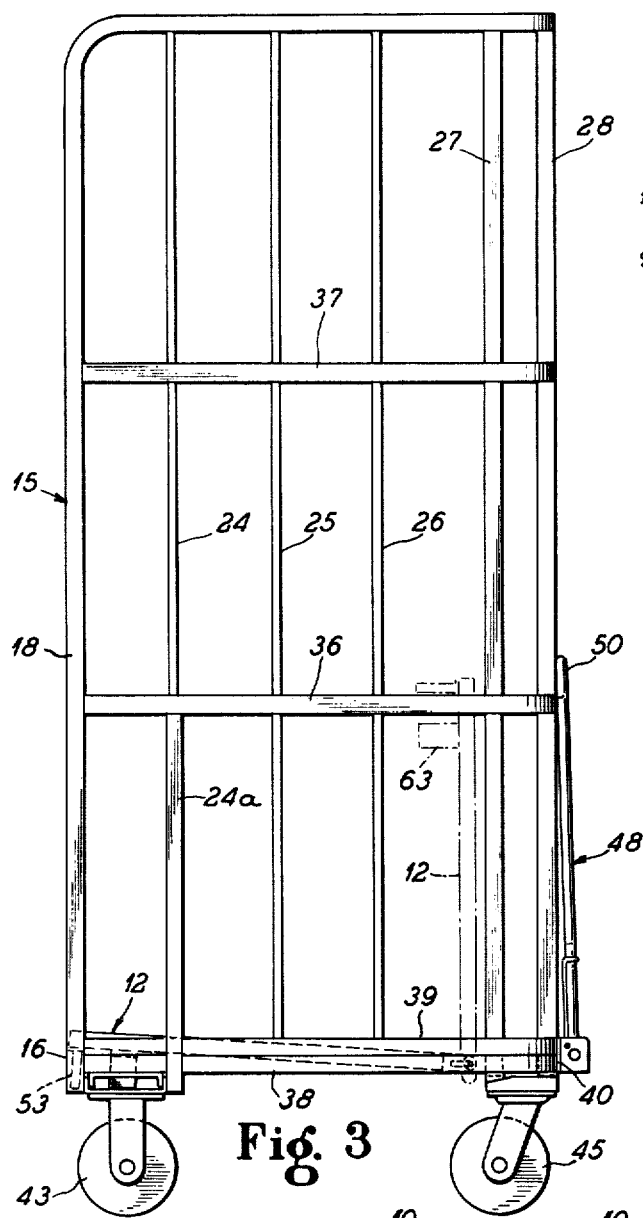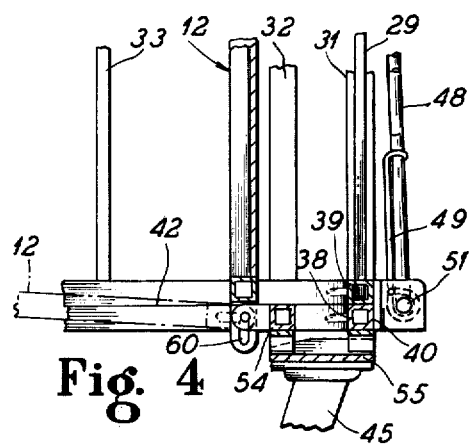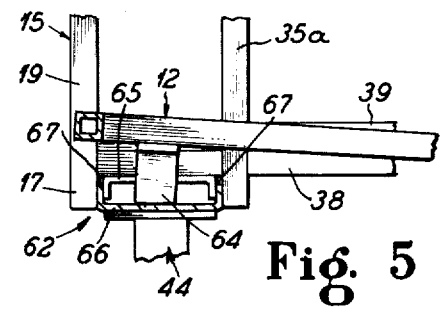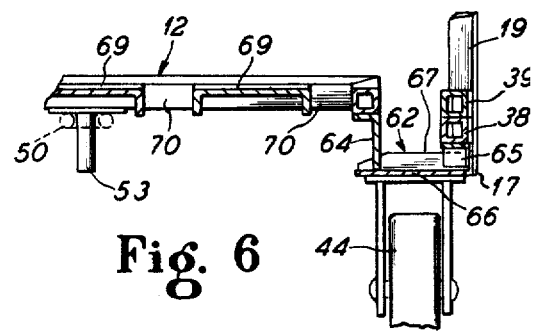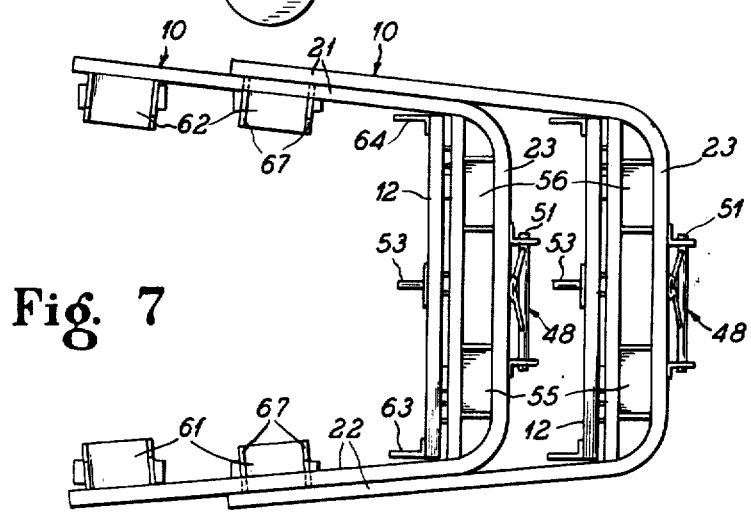

3,874,689

1

NESTABLE CART

BACKGROUND OF THE INVENTION

1. Field of the Invention

This invention relates to carts, and more specifically to a cart of rigidified construction which can be nested with other like carts.

2. Prior Art

Carts have been provided previously that have sides and which to a greater or lesser extent fold up to enable nesting fd unfolding. Further, the foldability feature has in the past rendered the carts either non-movable on wheels or has rendered them unstable when folded. Further, it has been common for employees or other handlers not to fold the foldable carts whereby they continue to take the space of an unfolded cart.

Accordingly, it is an object of the present invention to provide a stronger sturdier nestable cart than has heretofore been commercially available.

Another object of the present invention is to provide a nestable cart which is at all times stable and movable on wheels.

Another object of the present invention is to provide a nestable cart wherein the side structure is non-foldable, thereby eliminating wearing between folded metal side structure components and also minimizing the likelihood that employees and handlers will not nest the empty carts.

Carts of this type are typically transported up and down on mechanized tailgates of trucks. Where folding is inconvenient or where the carts if folded can no longer be moved on wheels, or where carts if folded are unstable, it has been commonplace for the employees and handlers to place them on truck tailgates in the unfolded position, thereby limiting capacity of a typically sized tailgate handling typically sized carts to two carts. Typical travel time for a tailgate is 30 seconds per upward trip and 10 seconds per downward trip, and with the high cost of labor used to handle such carts, a considerable saving in cost of usage is achieved by utilizing carts constructed in accordance with the present invention wherein six nested carts can be readily handled at one time on a typical tailgate. Accordingly, it is a further object of the present invention to provide a nestable cart that can be moved horizontally and vertically when empty in a nested condition.

SUMMARY OF THE PRESENT INVENTION

In accordance with this invention, a nestable cart comprises a horizontal base of U-shaped configuration, the legs of the U-shape diverging at the open end of the U-shape, and having a set of wheels secured thereto, a shelf pivotally connected to said base at the closed end of the U-shape and movable between upright and lowered positions, means acting between said base and said shelf for supporting said shelf in said lowered position, and a vertically extending side structure having a rigid U-shaped horizontal configuration rigidly secured to said U-shaped base.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWINGS

FIG. 3 is a side elevational view of the structure of FIG. 1;

FIG. 4 is an enlarged fragmentary cross-sectional view taken along line IV—IV of FIG. 2;

FIG. 5 is an enlarged fragmentary cross-sectional view taken along line V—V of FIG. 2;

FIG. 6 is an enlarged cross-sectional view taken along line VI—VI of FIG. 2; and FIG. 7 is a top view, partly diagrammatic, showing two of the carts of FIG. 1 nested together.

AS SHOWN ON THE DRAWINGS

Figure 1:
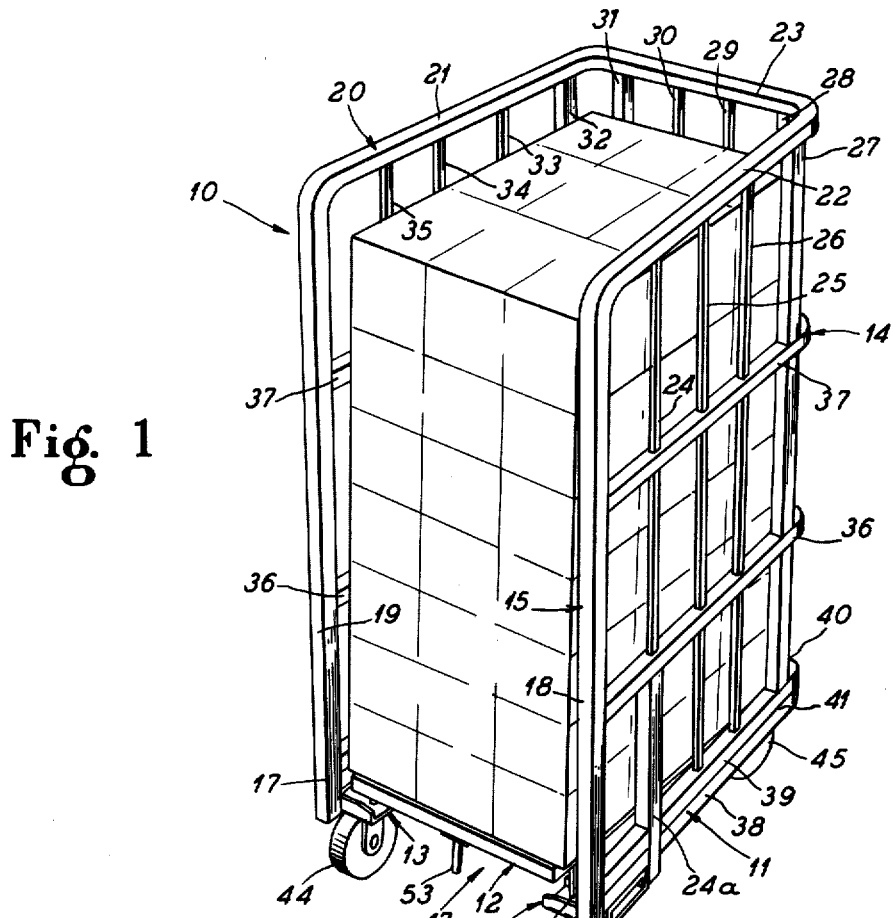
FIG. 1 is a perspective view of a nestable cart provided in accordance with the principles of the present invention, and shown supporting a number of cartons.

The principles of the present invention are particularly useful when embodied in a nestable cart such as shown in perspective in FIG. 1, generally indicated by the numeral 10. The cart 10 includes a horizontal base 11, a pivotable shelf 12, supporting means 13 for one end of the shelf 12, and side structure generally indicated at 14.

The side structure 14 has a rigid U-shaped horizontal cross-sectional configuration and to that end comprises a first tube 15 which has ends 16, 17 respectively secured to the free ends of the horizontal U-shaped base 11, the tube 15 having portions 18, 19 which are upwardly extending and which are integral with a central portion 20 of U-shaped configuration having diverging legs or leg portions 21, 22 which diverge from a closed end portion 23. The U-shaped central portion 20 of the tube 15 overlies the U-shaped configuration of the horizontal base 11. The side structure 14 further includes a first number of additional tubes 24–35 which join the U-shaped portion 20 to the U-shaped base 11 rigidly. The side structure 14 further includes a second number of additional U-shaped tubes 36, 37 the ends of which are joined to the first tube 15 and intermediate portions of which are joined to the first number of additional tubes 24–35. In this embodiment, the U-shapes of the base, the central portion 20 of the first tube 15, and the tubes 36, 37 are dimensioned alike so that their outer surfaces lie in a common U-shaped envelope or configuration, thus being devoid of projections or shoulders.

The base 11 in this embodiment comprises a pair of tubes 38, 39 that are welded together and of like shape and the tubes 38, 39 lie in the same U-shaped configuration as the tubes 15, 36 and 37 do.

The tubes shown are of substantially square cross section, the tubes 24–26, 29, 30 and 33–35 being of smaller cross-sectional size. The other tubes are of larger cross-sectional size and are apertured to receive the various ends of the smaller tubes or are apertured to enable the smaller tube to pass therethrough, there being a weld at each junction between the various tubes or tube sections. The tubes 27, 28, 31 and 32 are in fact three separate tube sections welded to the U-shaped tubes at each of their ends. Further, the tubes 24, 35 terminate at the U-shaped tube 36 and enlarged tubes 24a, 25a are disposed as extensions thereof. In this manner, the entire side structure 14 is completely rigidified in all of its connections between elements thereof and in all of its connections with the U-shaped base 11.

Figure 2:
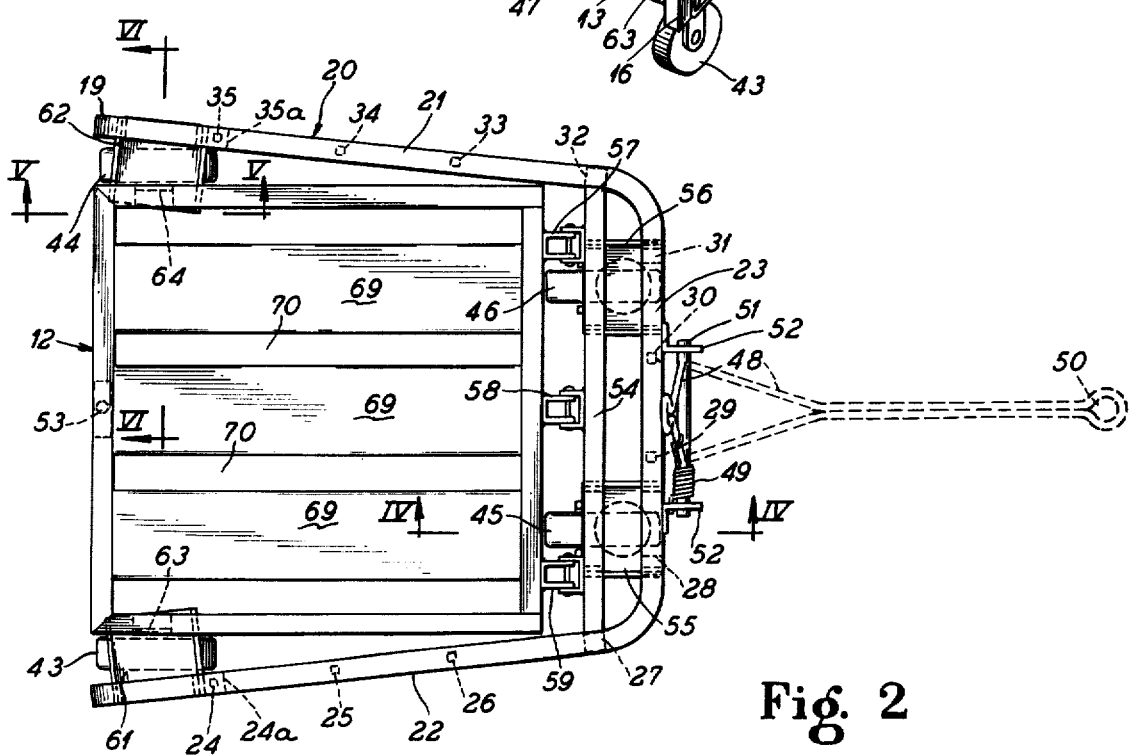
FIG. 2 is a top view of the structure of FIG. 1.

The horizontal base 11 thus has a U-shaped configuration having a closed end 40 from which a pair of legs 41, 42 diverge in a horizontal direction, there being a set of wheels 43–46 (all shown in FIG. 2) secured to the base 11. Further, the base 11 thus has an open end 47 which is receptive of other carts 10. As best seen in FIGS. 2 and 4, a tow bar 48 is pivotally secured to the closed end 40 of the base 11, a spring 49 acting between the base 11 and the tow bar 48 to urge the same toward an upright position as shown in FIGS. 3 and 4, and as shown in solid lines in FIG. 2. The tow bar 48 has a loop 50 at its unsupported end and a support shaft 51 at the opposite end supported by a pair of brackets 52, 52. The ring 50 is adapted to receive a hitch pin carried by a tow vehicle. To enable such vehicle to pull or tow a plurality of the carts 10, the shelf 12 is further preferably provided with a hitch pin 53 which is secured to that side of the shelf 12 which is the lower side when the shelf 12 is in the lowered position as illustrated in FIGS. 1–3. To connect one of the carts 10, the tow bar 48 is lowered so that the ring 50 is lower than the support shaft 51, thus enabling the ring 50 to be slipped around the hitch pin 53 of another cart 10 or around an analogous hitch pin on the tow vehicle. The spring 49 keeps the hitch 50, 53 engaged, and the same can be readily disengaged by stepping on the tow bar 48.

The horizontal base 11 further includes a horizontal tube 54 welded to the lower U-shaped tube 38 and extending between the legs thereof adjacent the closed end 40 of the U-shaped base as seen in FIGS. 2 and 4. The horizontal tube 54 and the closed end 40 of the base 11 jointly support a pair of wheel brackets 55, 56 to which commercially available castered wheels are bolted.

The pivotal connection between the shelf 12 and the base 11 is provided by a number of hinges, such as three, and best seen in FIG. 2 at 57–59. One hinge element of each of the hinges 57, 59 is welded to the horizontal tube 54 of the base and the other hinge element is welded to the adjacent edge of the shelf 12.

Supporting means are provided to hold the shelf 12 in the upright position, and in this embodiment, such supporting means comprise a slot in the corresponding elements of the hinges 57–59, the slot being on the element secured to the shelf 12 in this embodiment as best seen in FIG. 4 at 60. One end of the slot 60 is the hinge point for pivoting the shelf between the lowered and the upright positions and once the upright position is reached, the shelf is lowered to the extent permitted by the other end of the slot 60 so that the projecting end of the hinge element interferes with adjacent structure, thereby holding the shelf in a supported upright position.

The shelf 12 has an overall outside size which enables it to be pivoted between the lowered and the upright positions while remaining within the U-shape of the base 11 and the side structure 14, as clearly shown in FIG. 2.

The wheels 43, 44 are supported by a pair of wheel brackets 61, 62 to which they are bolted. The brackets 61, 62 form part of the supporting means 13, namely the part secured to the base 11, the supporting means 13 further including a pair of fingers 63, 64 rigidly secured to the shelf 12 remotely from its pivoted end. The fingers 63, 64 engage the brackets 61, 62 to define the lowered position of the shelf 12 and have such length that the upper surface of the shelf 12 slopes downwardly toward the closed end 40 of the base 11. The brackets 61, 62 are secured to the lower side of the U-shaped tube 38 at its free ends and project into the space between the legs of the U-shape, each bracket 61, 62 thus projecting toward the other bracket 62, 61.

The wheel brackets 61, 62 have a special feature that enables the nesting, and the same feature is built into the wheel brackets 55, 56 so as to keep the lower side of such brackets in a common plane.

The structure of the wheel bracket 62 is best shown in FIGS. 5 and 6, and this structure is representative of that of the other wheel brackets. The bracket 62 comprises a short section of channel 65 which is downwardly opening and which is welded to the lower side of the U-shaped tube 38 as shown in FIG. 5. It has a horizontal extent in the other horizontal direction shown in FIG. 6 as merely underlying the tube 38. The bracket 62 further comprises an upwardly opening channel section 66 best seen in FIG. 5 which is secured to the tubes 15 and 35a and to the channel section 65. The channel section 66 has a horizontal extent best seen in FIG. 6 which projects toward the opposite wheel bracket 61 in underlying relation to the lowered position of the shelf 12 where the same can be engaged by the finger 64 and to provide a surface beneath it for attachment of the wheel 44. The upper edge 67 of the channel 66 thus lies below the lower surface of the tube 38 and thus another cart can readily have its closer wheels 45, 46 pass between the wheel brackets 61, 62 with the lower surface of the base 11 passing over the edge 67 as shown in FIG. 7. If desired, the central edge thereof is beveled as shown best in FIG. 6 to facilitate such nesting on an uneven floor.

As best seen in FIGS. 2 and 6, the shelf 12 comprises a number of longitudinal channels 69 leaving therebetween a number of elongated finger slots 70 into which fingers may project for reaching below the lowermost articles stacked thereon.

The slope of the shelf 12 provides a slight stabilizing force by tilting the load toward the closed end of the side structure 14.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A nestable cart comprising:
   a. a horizontal base of rigid U-shaped configuration, the legs of the U-shape diverging at the open end of the U-shape, and having a set of wheels secured thereto;
   b. a shelf hinged to said base by hinge means at the closed end of the U-shape adjacent to said wheels and movable between an upright generally vertical position for nesting and a lowered generally horizontal position for use, said hinge means including hinge elements slotted for holding said shelf in said vertical position;
   c. means acting between said base and said shelf for supporting said shelf in said lowered position; and
   d. a vertically extending side structure having a rigid diverging U-shaped horizontal cross-sectional configuration rigidly secured to and directly overlying said U-shaped base.

2. A nestable cart according to claim 1 in which said base comprises a pair of coextending joined-together tubes, said side structure being welded to the upper of said tubes and said set of wheels being secured to the lower of said tubes.

3. A nestable cart according to claim 1 in which said supporting means includes a pair of brackets secured to said base and projecting into the space between the legs and to which two of the wheels are respectively attached, the upper surface of said brackets lying in a plane below the lower surface of said base to enable the base of another cart to extend thereover when nested.

4. A nestable cart according to claim 1 in which said base includes a horizontal tube secured to the legs of the U shaped base in spaced relation to the closed end of the U shape, and to which said shelf is pivoted, and a pair of brackets secured to said horizontal tube and to said closed end, and providing the support for two of the wheels.

5. A nestable cart according to claim 1, there being an elongated slot in said shelf for receiving the finger of a user during grasping for unloading the cart.

6. A nestable cart according to claim 1 in which said shelf is rectangular and in its lowered position is disposed vertically within said diverging rigid base.

7. A nestable cart according to claim 1 in which said side structure comprises a first tube secured at its ends to said base at the free ends of the legs of the U-shape and extending upwardly therefrom, the central portion of the tube comprising a horizontal U-shape overlying said U-shaped base, and a first number of additional tubes rigidly connected to and joining said U-shapes together.

8. A nestable cart according to claim 7 which includes a second number of additional tubes of U-shaped configuration rigidly secured at its ends to said first tube and intermediate its ends to said first number of additional tubes.

9. A nestable cart according to claim 1 in which said base is horizontal and said supporting means holds said shelf so that it slopes downwardly toward the closed end of said base.

10. A nestable cart according to claim 9 in which said sloping shelf is disposed within the vertical extent of said horizontal U-shaped base.

11. A nestable cart according to claim 1 including a tow bar having a pivotal connection with the closed end of said U-shaped base and movable between depressed horizontal and raised vertical positions.

12. A nestable cart according to claim 11 including a spring biasing said tow bar toward the raised position.

13. A nestable cart according to claim 12 including a downwardly projecting hitch pin secured to the lower side of the lowered shelf opposite the pivotal connection for reception in an opening in the tow bar of a similar cart.

* * * * *